US012759433B2

(12) United States Patent
Taylor et al.

(10) Patent No.: US 12,759,433 B2
(45) Date of Patent: Oct. 13, 2026

(54) TRACTION BATTERY PACK SUPPORT SYSTEM

(71) Applicant: Ford Global Technologies, LLC, Dearborn, MI (US)

(72) Inventors: Derek Timothy Taylor, Waterford, MI (US); Nicholas Braeseker, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 232 days.

(21) Appl. No.: 18/760,546

(22) Filed: Jul. 1, 2024

(65) Prior Publication Data

US 2025/0187418 A1 Jun. 12, 2025

Related U.S. Application Data

(60) Provisional application No. 63/607,888, filed on Dec. 8, 2023.

(51) Int. Cl.

| | |
|---|---|
| ***B60L 50/64*** | (2019.01) |
| ***B60K 1/04*** | (2019.01) |
| ***B60N 2/005*** | (2006.01) |
| ***H01M 10/625*** | (2014.01) |
| ***H01M 50/204*** | (2021.01) |
| ***H01M 50/242*** | (2021.01) |
| ***H01M 50/244*** | (2021.01) |
| ***H01M 50/258*** | (2021.01) |
| ***H01M 50/271*** | (2021.01) |
| ***H01M 50/289*** | (2021.01) |
| *B60L 50/60* | (2019.01) |

(52) U.S. Cl.

CPC ................ *B60N 2/005* (2013.01); *B60K 1/04* (2013.01); *B60L 50/64* (2019.02); *H01M 10/625* (2015.04); *H01M 50/204* (2021.01); *H01M 50/242* (2021.01); *H01M 50/244* (2021.01); *H01M 50/258* (2021.01); *H01M 50/271* (2021.01); *H01M 50/289* (2021.01); *B60K 2001/0438* (2013.01); *B60L 50/60* (2019.02); *B60L 50/66* (2019.02); *H01M 2220/20* (2013.01)

(58) Field of Classification Search

CPC .. B60N 2/005; H01M 10/625; H01M 50/289; H01M 50/242; H01M 50/244; H01M 50/258; H01M 50/204; H01M 50/271; H01M 2220/20; B60L 50/64; B60L 50/60; B60L 50/66; B60K 1/04; B60K 2001/0438

See application file for complete search history.

(56) References Cited

U.S. PATENT DOCUMENTS

| | | | | |
|---|---|---|---|---|
| 10,005,350 | B1 * | 6/2018 | Khan | B60K 1/04 |
| 11,005,137 | B2 | 5/2021 | Dunlap et al. | |
| 11,251,486 | B2 * | 2/2022 | Popovski | H01M 50/264 |
| 2017/0214013 | A1 | 7/2017 | Benedict et al. | |

(Continued)

*Primary Examiner* — Edwin A Young

(74) *Attorney, Agent, or Firm* — David B. Kelley; Carlson, Gaskey & Olds, P.C.

(57) ABSTRACT

A traction battery pack support system includes an enclosure assembly of a battery pack, a support system that is outside of the enclosure assembly, a battery pack component that is held within an interior area of the enclosure assembly, and one or more fasteners that extend through the support system and the enclosure assembly to engage the battery pack component within the interior area.

19 Claims, 4 Drawing Sheets

(56) References Cited

U.S. PATENT DOCUMENTS

| | | | | |
|---|---|---|---|---|
| 2019/0355948 | A1* | 11/2019 | Smith | B60K 1/04 |
| 2021/0359366 | A1 | 11/2021 | Chen et al. | |
| 2022/0131119 | A1* | 4/2022 | Popovski | H01M 50/244 |
| 2023/0106602 | A1 | 4/2023 | Wang et al. | |

* cited by examiner

TRACTION BATTERY PACK SUPPORT SYSTEM

CROSS-REFERENCE TO RELATED APPLICATIONS

This disclosure claims priority to U.S. Provisional Application No. 63/607,888, which was filed on Dec. 8, 2023, and is incorporated herein by reference in its entirety.

TECHNICAL FIELD

This disclosure details exemplary traction battery pack support systems and, more particularly, to support systems that secure both a support system and an enclosure assembly to a component within the enclosure assembly.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines.

SUMMARY

In some aspects, the techniques described herein relate to a traction battery pack support system, including: an enclosure assembly of a battery pack; a support system that is outside of the enclosure assembly; a battery pack component that is held within an interior area of the enclosure assembly; and one or more fasteners that extend through the support system and the enclosure assembly to engage the battery pack component within the interior area.

In some aspects, the techniques described herein relate to a traction battery pack support system, wherein the battery pack component is an endplate of a battery array.

In some aspects, the techniques described herein relate to a traction battery pack support system, wherein the one or more fasteners engage a bore of the endplate to directly secure the battery pack component and the enclosure assembly to the support system.

In some aspects, the techniques described herein relate to a traction battery pack support system, wherein the endplate is a first endplate at a first end portion of the battery array, and the battery array includes a second endplate at an opposing, second end portion of the battery array, the enclosure assembly and support system secured directly to both the first endplate and the second endplate.

In some aspects, the techniques described herein relate to a traction battery pack support system, wherein the one or more fasteners include one or more bolts.

In some aspects, the techniques described herein relate to a traction battery pack support system, wherein the one or more fasteners include one or more threaded fastener.

In some aspects, the techniques described herein relate to a traction battery pack support system, wherein the support system is a skid plate.

In some aspects, the techniques described herein relate to a traction battery pack support system, wherein the support system is a support bracket.

In some aspects, the techniques described herein relate to a traction battery pack support system, wherein the support bracket is connected to both a driver side frame rail and a passenger side frame rail.

In some aspects, the techniques described herein relate to a traction battery pack support system, wherein the support bracket is connected to both a driver side frame rail and a passenger side frame rail.

In some aspects, the techniques described herein relate to a traction battery pack support system, wherein the one or more fasteners extend through a throughhole in a floor of the enclosure assembly.

In some aspects, the techniques described herein relate to a traction battery pack support system, wherein the one or more fasteners additionally extend through a throughhole in the support system.

In some aspects, the techniques described herein relate to a traction battery pack support system, wherein the enclosure assembly is an enclosure tray.

In some aspects, the techniques described herein relate to a traction battery pack support system, wherein the enclosure assembly directly supports a battery array that includes the battery pack component.

In some aspects, the techniques described herein relate to a traction battery pack support system, wherein the one or more fasteners secure the support system and the enclosure assembly to the support system from a position outside the enclosure assembly and from a position outside any enclosure assembly of a battery pack.

In some aspects, the techniques described herein relate to a traction battery pack support system, including: an enclosure assembly of a battery pack, the enclosure assembly having an enclosure tray; one or more battery arrays within the enclosure tray, the one or more battery arrays including a plurality of battery cells disposed along a cell stack axis between a first endplate and a second endplate; a battery pack support system extending beneath a floor of the enclosure tray; and a plurality of mechanical fasteners that extend through the floor and the battery pack support system to engage the first endplate or the second endplate.

In some aspects, the techniques described herein relate to a traction battery pack support system, wherein the battery pack support system is a skid plate.

In some aspects, the techniques described herein relate to a traction battery pack support system, wherein the battery pack support system includes a forward bracket that is secured directly to the first endplate, and a rear bracket that is secured directly to the second endplate.

In some aspects, the techniques described herein relate to a traction battery pack support system, wherein the plurality of mechanical fasteners are a plurality of threaded mechanical fasteners.

In some aspects, the techniques described herein relate to a traction battery pack support system, wherein the plurality of mechanical fasteners each extend through a bore in the enclosure tray and a bore in the battery pack support system.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

A battery pack can include a battery array disposed within an enclosure assembly. This disclosure details relates generally to supporting the battery array through both the enclosure assembly and a support system that is outside the enclosure assembly.

Figure 1:
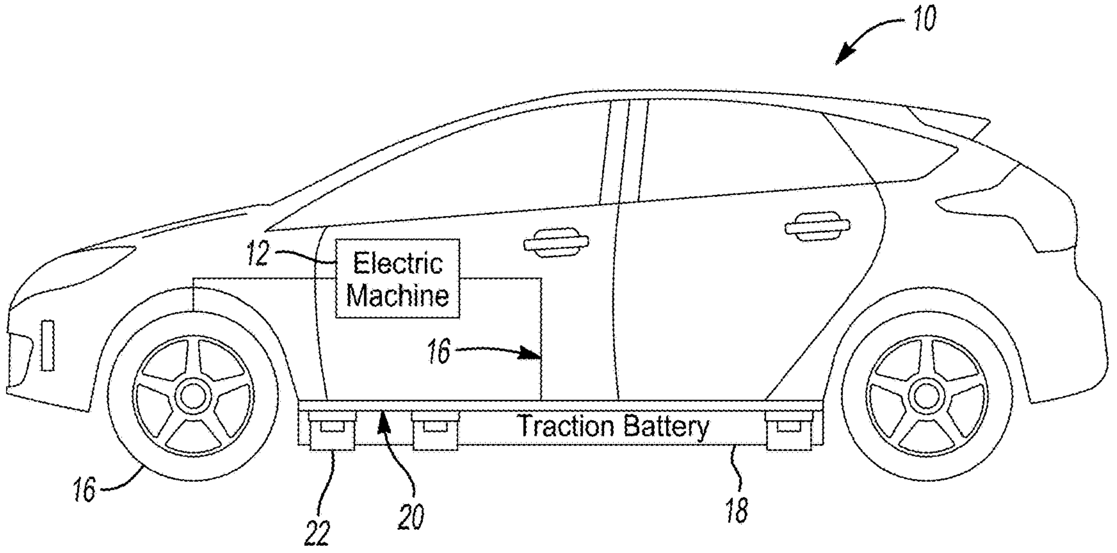
FIG. 1 illustrates a side view of an electrified vehicle having a battery pack.
Figure 2:
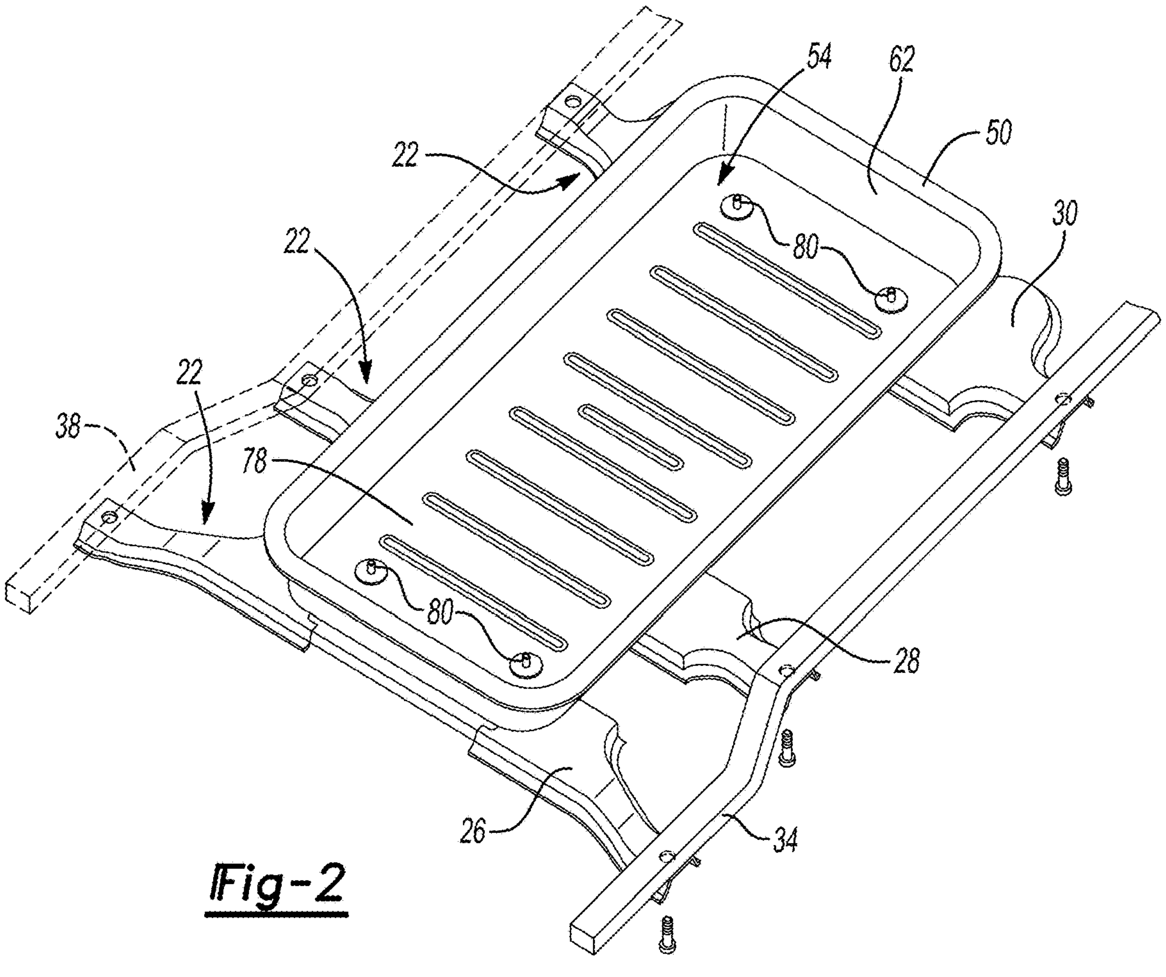
FIG. 2 illustrates a perspective view of an enclosure tray of the battery pack of FIG. 1, along with a support system used to support the battery pack.
Figure 3:
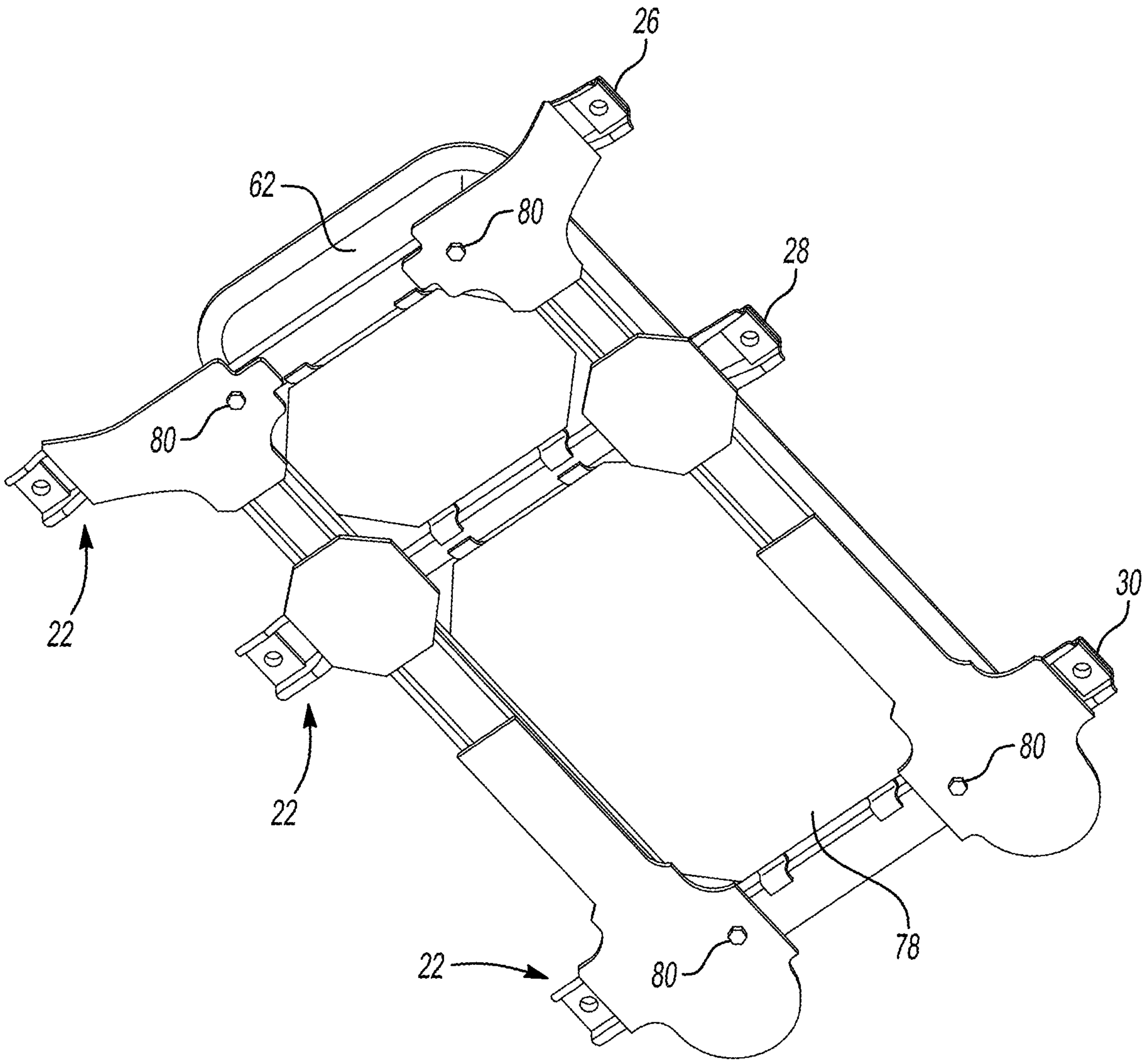
FIG. 3 illustrates a bottom view of the enclosure tray and the support system of FIG. 2.
Figure 4:
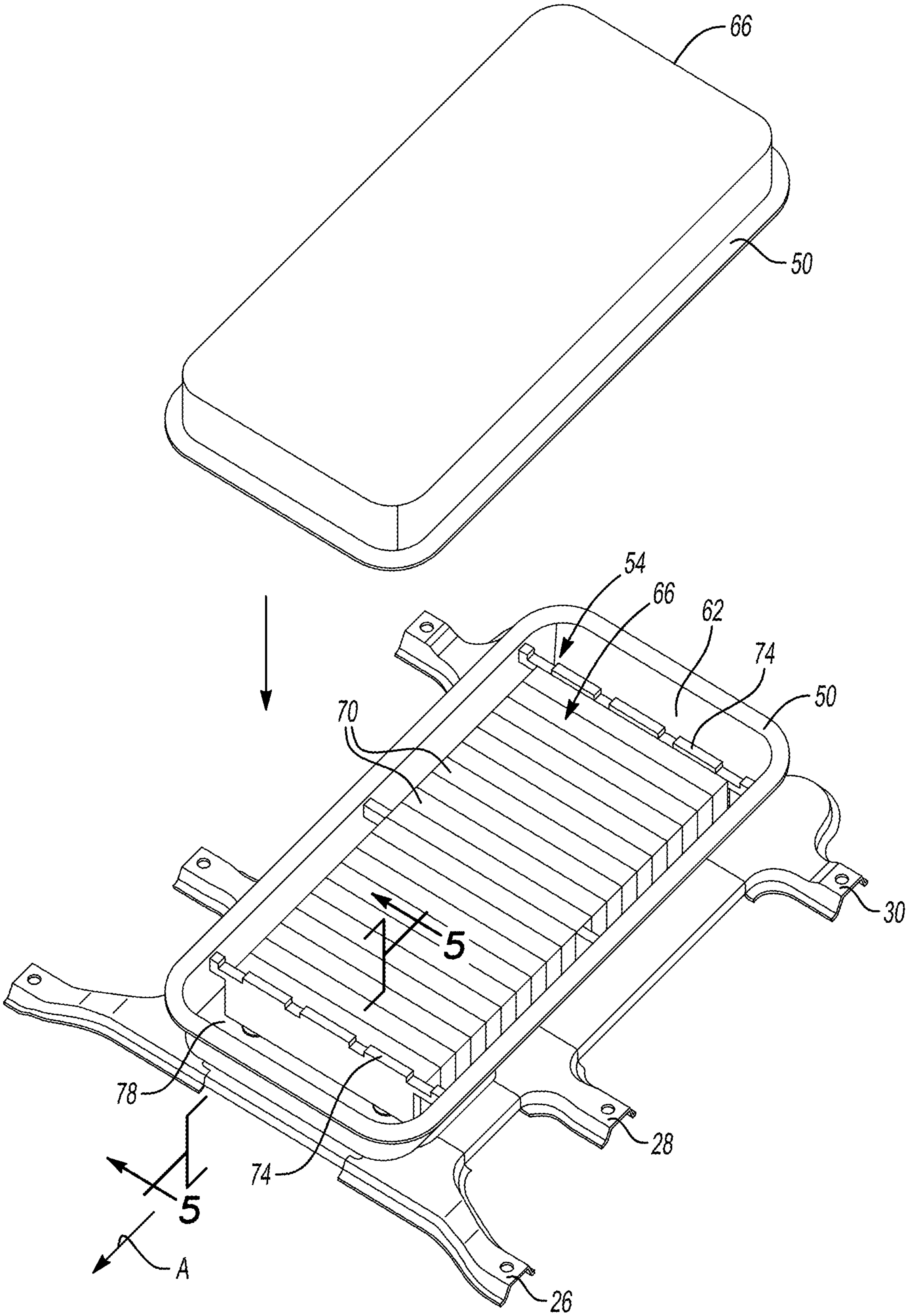
FIG. 4 illustrates the components shown in FIG. 2, along with a battery array secured to the support system through endplates of the battery array.
Figure 5:
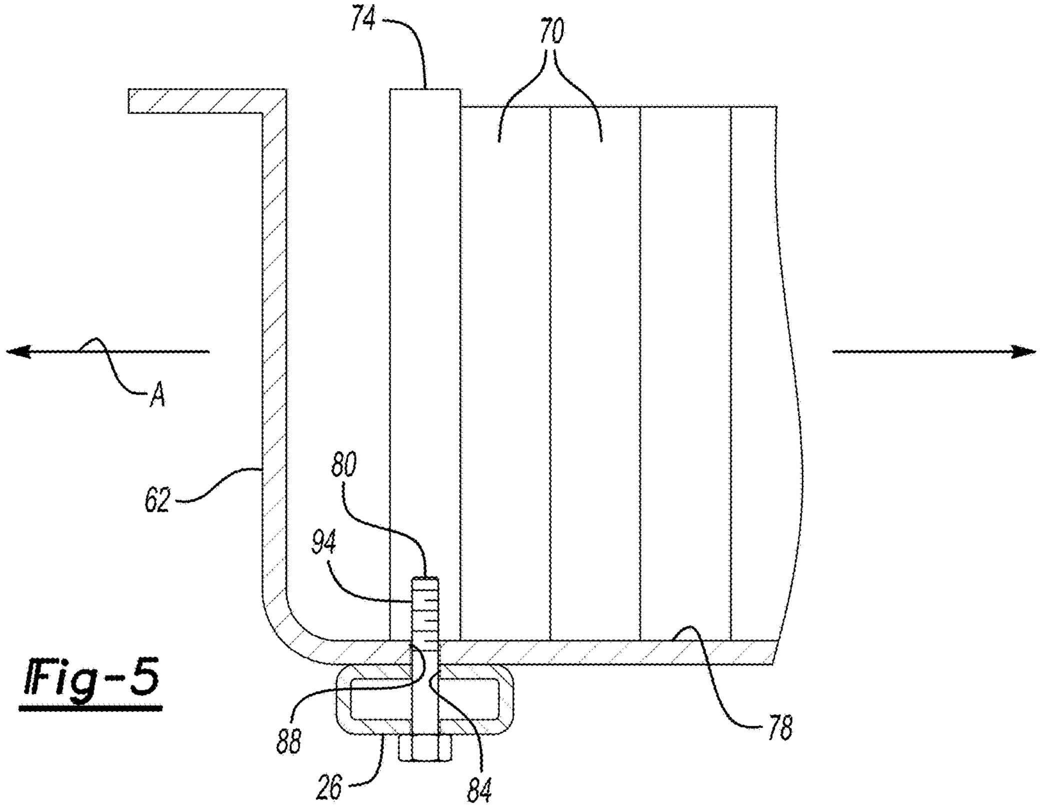
FIG. 5 illustrates a section view at line 5-5 in FIG. 4.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEVs), fuel cell vehicles, etc. Therefore, although not specifically shown in the exemplary embodiment, the powertrain of the electrified vehicle 10 could be equipped with an internal combustion engine that can be employed either alone or in combination with other power sources to propel the electrified vehicle 10.

In the illustrated embodiment, the electrified vehicle 10 is depicted as a car. However, the electrified vehicle 10 could alternatively be a sport utility vehicle (SUV), a van, a pickup truck, or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component, assembly, or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more wheels 16 of the electrified vehicle 10.

A voltage bus electrically couples the electric machine 12 to a traction battery pack 18. The traction battery pack 18 is an exemplary electrified vehicle battery. The traction battery pack 18 may be a high voltage traction battery pack assembly that includes a plurality of battery cells capable of outputting electrical power to power the electric machine 12 and/or other electrical loads of the electrified vehicle 10. Other types of energy storage devices and/or output devices could alternatively or additionally be used to electrically power the electrified vehicle 10.

The traction battery pack 18 is secured to an underbody 20 of the electrified vehicle 10. However, the traction battery pack 18 could be located elsewhere on the electrified vehicle 10 in other examples.

With reference now to FIGS. 2 to 5, the traction battery pack 18 is, in this example, secured to the underbody 20 through a support system 22. In this example, the support system 22 includes a forward support bracket 26, and intermediate support bracket 28, and a rear support bracket 30. The forward support bracket 26, the intermediate support bracket 28, and the rear support bracket 30 each extend beneath the battery pack 18. The forward support bracket 26, the intermediate support bracket 28, and the rear support bracket 30 each connect to both a driver side frame rail 34 and a passenger side frame rail 38.

The battery pack 18 includes an enclosure assembly 50 providing an interior area 54 holding various battery pack components. The enclosure assembly 50, in this example, includes an enclosure cover 58 an enclosure tray 62 that cooperate to provide the interior area 54. The cover 58, the tray 62, or both can be a polymer-based material. In other examples, the cover 58, the tray 62, or both could be a metal or metal-alloy.

A battery array 66 is held within the interior area 54. In this example, the battery array 66 includes a plurality of individual battery cells 70 disposed along a cell stack axis A between a pair of endplates 74. The endplates 74 can be positioned to compress the battery cells 70 along the cell stack axis A.

The battery array 66 could include any number of battery cells 70. Further, the battery pack 14 could employ any number of battery arrays 66 within the enclosure assembly 50. Thus, this disclosure is not limited to the exact configuration shown.

In an embodiment, the battery cells 70 are pouch-style, lithium-ion cells. However, battery cells having other geometries (cylindrical, prismatic, etc.), other chemistries (nickel-metal hydride, lead-acid, etc.), or both could alternatively be utilized within the scope of this disclosure.

The battery array 66 rests on a floor 78 of the tray 62. To secure the battery array 66 within the interior area 54, a plurality of fasteners 80 engage the endplates 74. The fasteners 80 extend through a throughhole 84 in the support system 22 and a throughhole 88 in the floor 78 when engaging the endplates 74. The fasteners 80, in this example, are threaded mechanical fasteners that threadably engage respective bores 94 within the endplates 74. This directly secures the endplates 74 to the floor 78 of the enclosure tray 62 and to the support system 22. The fasteners 80 can be bolts. Although the example fasteners 80 engage endplates 74, the fasteners 80 could engage other battery components that are held within the interior area 54 in other examples.

Heads 96 of the fasteners 80 can be accessed from beneath the support system 22 and the floor 78 of the enclosure tray 62. The fasteners 80 are thus accessible from outside the enclosure assembly 50.

Figure 6:
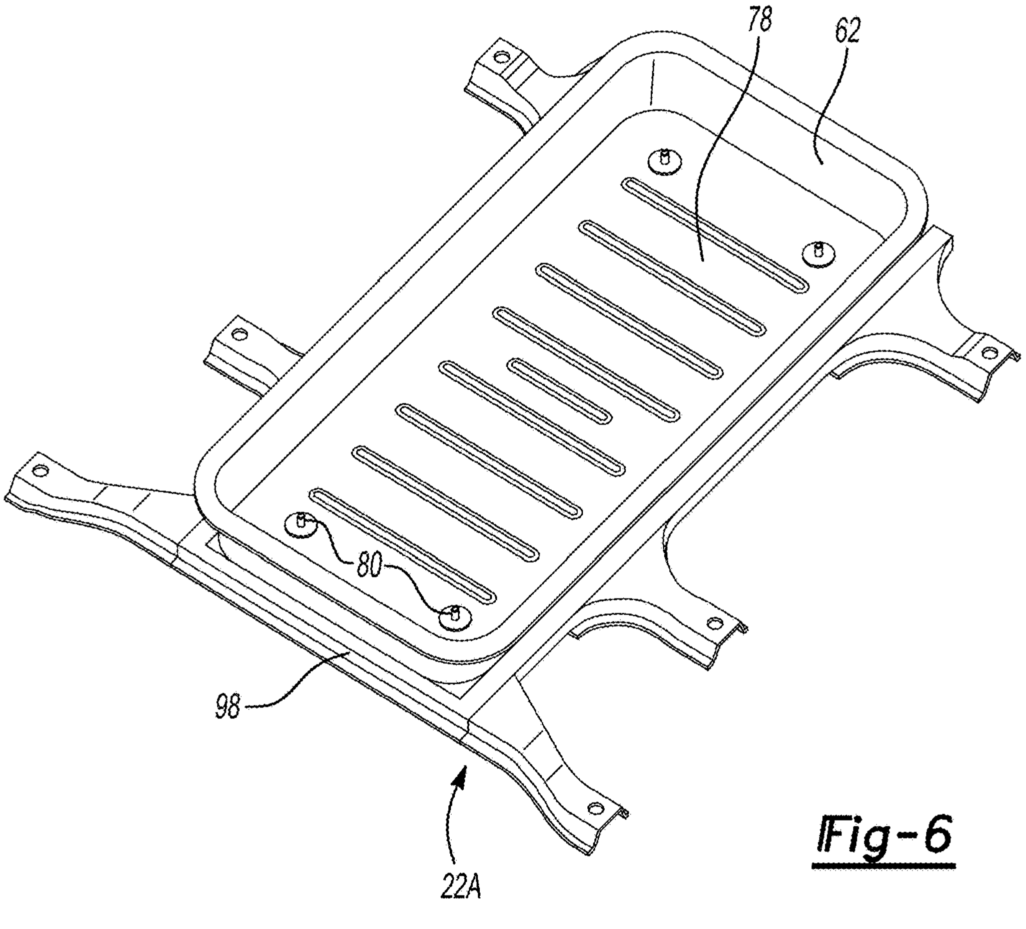
FIG. 6 illustrates a perspective view of an enclosure tray and a battery array from the battery pack of FIG. 1, along with a support system according to another exemplary aspect of the present disclosure.

With reference now to FIG. 6, another example support system 22A includes a skid plate 98. The fasteners 80 can extend through a throughhole in the skid plate 98 and a throughhole in the floor 78 of the tray 62 to engage endplates of a battery array (or another component of the battery array) to secure the battery array to the tray 62 and the skid plate 98. In this example, the skid plate 98 is a planar structure that extends horizontally past a periphery of the floor 78 about an circumferential periphery of the enclosure assembly 50. The skid plate 98 can shield the floor 78 and other portions of the battery pack 18 from debris.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A traction battery pack support system, comprising:

an enclosure assembly of a battery pack;

a support system that is outside of the enclosure assembly;

a battery pack component that is held within an interior area of the enclosure assembly; and one or more fasteners that extend through the support system and the enclosure assembly to engage the battery pack component within the interior area.

2. The traction battery pack support system of claim 1, wherein the battery pack component is an endplate of a battery array.

3. The traction battery pack support system of claim 2, wherein the one or more fasteners engage a bore of the endplate to directly secure the battery pack component and the enclosure assembly to the support system.

4. The traction battery pack support system of claim 2, wherein the endplate is a first endplate at a first end portion of the battery array, and the battery array includes a second endplate at an opposing, second end portion of the battery array, the enclosure assembly and support system secured directly to both the first endplate and the second endplate.

5. The traction battery pack support system of claim 1, wherein the one or more fasteners comprise one or more bolts.

6. The traction battery pack support system of claim 1, wherein the one or more fasteners comprise one or more threaded fasteners.

7. The traction battery pack support system of claim 1, wherein the support system is a skid plate.

8. The traction battery pack support system of claim 1, wherein the support system is a support bracket.

9. The traction battery pack support system of claim 8, wherein the support bracket is connected to both a driver side frame rail and a passenger side frame rail.

10. The traction battery pack support system of claim 1, wherein the one or more fasteners extend through a throughhole in a floor of the enclosure assembly.

11. The traction battery pack support system of claim 10, wherein the one or more fasteners additionally extend through a throughhole in the support system.

12. The traction battery pack support system of claim 1, wherein the enclosure assembly is an enclosure tray.

13. The traction battery pack support system of claim 1, wherein the enclosure assembly directly supports a battery array that includes the battery pack component.

14. The traction battery pack support system of claim 1, wherein the one or more fasteners secure the enclosure assembly to the support system from a position outside the enclosure assembly and from a position outside any enclosure assembly of a battery pack.

15. A traction battery pack support system, comprising:

an enclosure assembly of a battery pack, the enclosure assembly having an enclosure tray;

one or more battery arrays within the enclosure tray, the one or more battery arrays including a plurality of battery cells disposed along a cell stack axis between a first endplate and a second endplate;

a battery pack support system extending beneath a floor of the enclosure tray; and a plurality of mechanical fasteners that extend through the floor and the battery pack support system to engage the first endplate or the second endplate.

16. The traction battery pack support system of claim 15, wherein the battery pack support system is a skid plate.

17. The traction battery pack support system of claim 15, wherein the battery pack support system includes a forward bracket that is secured directly to the first endplate, and a rear bracket that is secured directly to the second endplate.

18. The traction battery pack support system of claim 15, wherein the plurality of mechanical fasteners are a plurality of threaded mechanical fasteners.

19. The traction battery pack support system of claim 18, wherein the plurality of mechanical fasteners each extend through a bore in the enclosure tray and a bore in the battery pack support system.

* * * * *